Jan. 21, 1941.  A. WERTHEIMER  2,229,156
COMPUTING MECHANISM
Filed Nov. 3, 1937   3 Sheets-Sheet 1

Inventor:
Albert Wertheimer
by Ransom K. Davis
Attorney

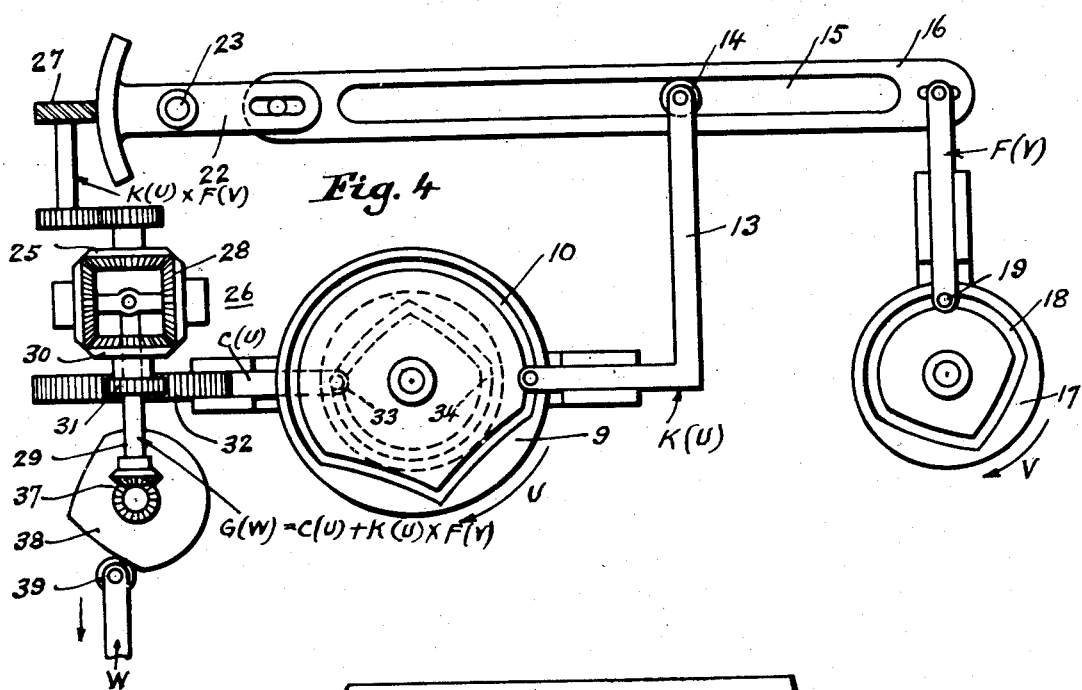
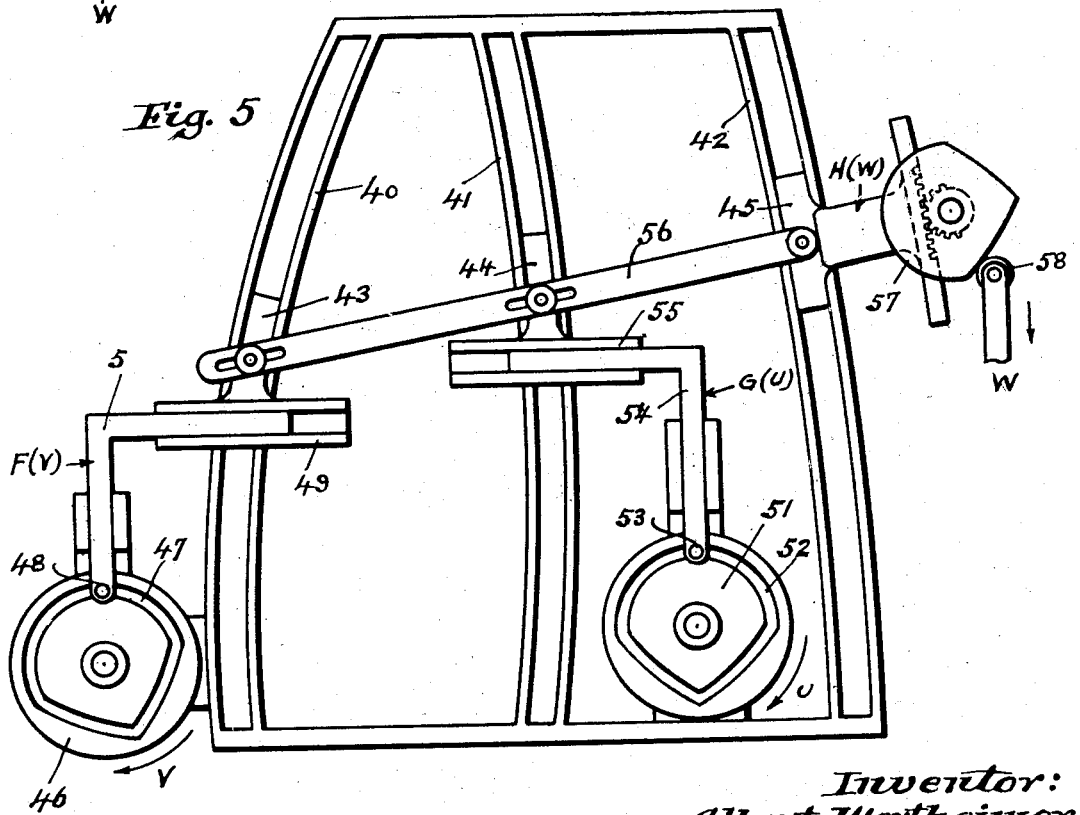

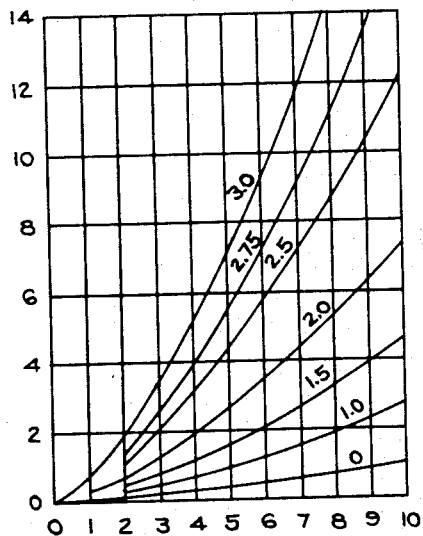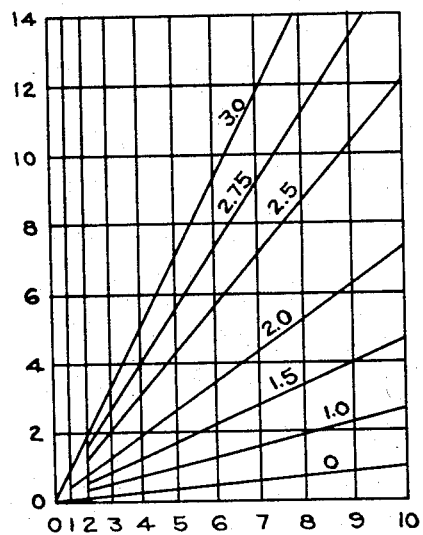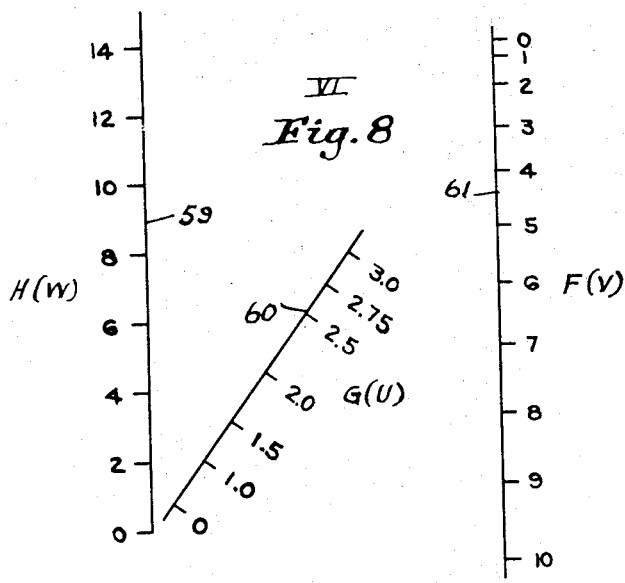

Patented Jan. 21, 1941

2,229,156

UNITED STATES PATENT OFFICE 2,229,156

COMPUTING MECHANISM

Albert Wertheimer, Washington, D. C.

Application November 3, 1937, Serial No. 172,571

7 Claims. (Cl. 235—61)

(Granted under the act of March 3, 1883, as amended April 30, 1928; 370 O. G. 757)

This invention relates to means for mechanically solving any equation between three variables and more particularly to a device of the type mentioned having only elements that function in two dimensions.

Among the several objects of this invention are:

To provide mechanism for generating a third variable from given functions of two other variables when the three variables are related mathematically by an equation of the type $$f(U,V,W)=0$$

To provide mechanism of the kind mentioned involving only elements that function in two dimensions;

To provide means for mechanically solving equations of the type above defined without the use of three dimensional cams with the resultant decrease in cost of production and simplification of the mechanism.

Other objects will become apparent by perusal of the description when read in connection with the accompanying drawings wherein:

Fig. 1 depicts mechanism for solving an equation of the type $$W=K(U) \times F(V)$$

Fig. 2 discloses a modification for solution of equations of the type $$W=C(U)+K(U) \times F(V)$$

Fig. 3 shows a form of my invention for solving equations of the type $$G(W)=K(U) \times F(V)$$

Fig. 4 discloses a form of my invention for solving equations of the type $$G(W)=C(U)+K(U) \times F(V)$$

Fig. 5 shows a different type of mechanism to solve any of the above equations, based on the principle illustrated in Fig. 8;

Fig. 6 shows the family of curves corresponding to different values of one variable having the relations to two other variables represented by the ordinates and abscissae of the scale when all curves have a common point;

Fig. 7 shows how the family of curves of Fig. 6 may be converted to a family of straight lines by plotting the same on a scale where the abscissae are calibrated to represent functional values instead of being uniform as in Fig. 6;

Fig. 8 is a representation of the values of three variables expressed by the calibration of the scales and the spatial arrangement of those scales so that a straight line intersecting the three scales will give, at the respective points of intersection with the scales, the corresponding values of the three variables.

Many instruments have heretofore been devised for generating as an output one of three related variables, when the other two variables are given as inputs. The common practice is to utilize three-dimensional cams, which are more or less roughly cylindrical in shape with an irregular surface so designed that, if the rotation of the cam is made proportional to one variable and the position of the cam follower along the axis of the cam represents the value of a second variable, then the radial distance of the follower from the axis of the cam is proportional to the third variable. Owing to the enormous number of points that must be determined to define the surface of such a cam accurately and the great expense of hand working to develop the surface represented by such points, it is desirable to provide mechanism that does not require three dimensional elements. Such cams require the location of hundreds of different points to define a desired surface with sufficient accuracy and the removal of the metal to develop the surface thus defined must be accomplished by hand lapping.

In the case of two variables a two-dimensional cam can always be constructed, so that if its rotation is made proportional to one of the variables, then the radial distance of the follower from the axis of the cam will be proportional to the other variable. In special cases the relation between the variables can be represented by a straight line and then a simple gearing or linkage with a ratio represented by the slope of the line will accomplish the same purpose as a cam. The extension of this idea to the case of three variables forms the basis of the present invention whereby, instead of three-dimensional cams, the result is achieved by combinations of two-dimensional cams, gearings and linkages.

Any relation between three variables U, V and W, is represented mathematically by an equation of the type $$f(U,V,W)=0 \qquad (1)$$

A graphical representation of Equation 1 in the plane is a family of curves, which may be derived either empirically or by mathematical processes, giving the relation between two of the variables when the third is kept constant. It is in general possible to transform a family of curves into approximately straight lines by making one or both the scales functional instead of uniform. Figs. 6 and 7 illustrate such a transformation for a family of curves in which it is necessary to make only one scale functional; in the coordinates of the transformed scale, the most general form that Equation 1 will take is $$G(W) = C(U) + K(U) \times F(V) \quad (2)$$

The mechanisms disclosed in the accompanying drawings illustrate several embodiments of the present invention to accomplish this transformation mechanically and give the desired solutions.

Figure 1:
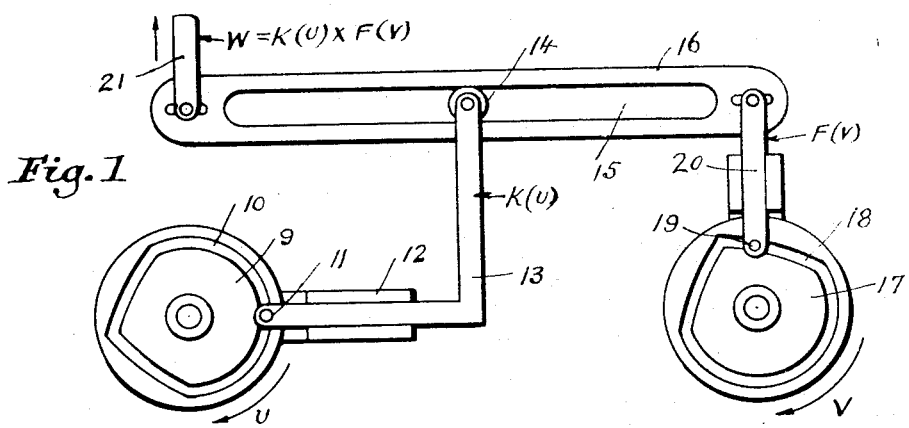

Fig. 1 illustrates a mechanism for the special case where $$G(W) = W, \text{ and } C(U) = 0$$

so that Equation 2 reduces to $$W = K(U) \times F(V)$$

In the transformed coordinates then the W-scale is uniform and all lines have a common point. The cam 9 is rotated proportionally to the variable U and has a cam face 10 corresponding to a function K. The cam follower 11 is constrained to follow the cam face 10 by means of a slide 12 operatively connected to the connecting member 13 by coacting ribs and grooves or in any other manner well-known in the art and bearing against the side of cam 9 opposite cam follower 11. It is to be understood that this mechanism is illustrated and described for explanatory purposes only and is not to be construed as in any way limiting, it being purely conventional and a type well-known in the mechanical arts. The other end of connecting member 13 carries a roller 14 disposed in the longitudinal slot 15 in lever 16 and constitutes a movable pivot for that lever, the displacement of the pivot along the lever due to rotation of cam 9 being such that the distances between the movable pivot and the fixed pivots of members 20 and 21 are in the ratio of K(U) to 1. The cam 17 is given rotation proportional to V and has a cam face 18 corresponding to a function F, the follower 19 that coacts with cam face 18 being connected to an end of lever 16 as shown and imparting to that end of the lever a movement corresponding to F(V). It will be obvious that the movement of that end of lever 16 to which output member 21 is connected will be represented by $K(U) \times F(V)$ and the output is therefore the solution for the equation $$W = K(U) \times F(V)$$

Figure 2:
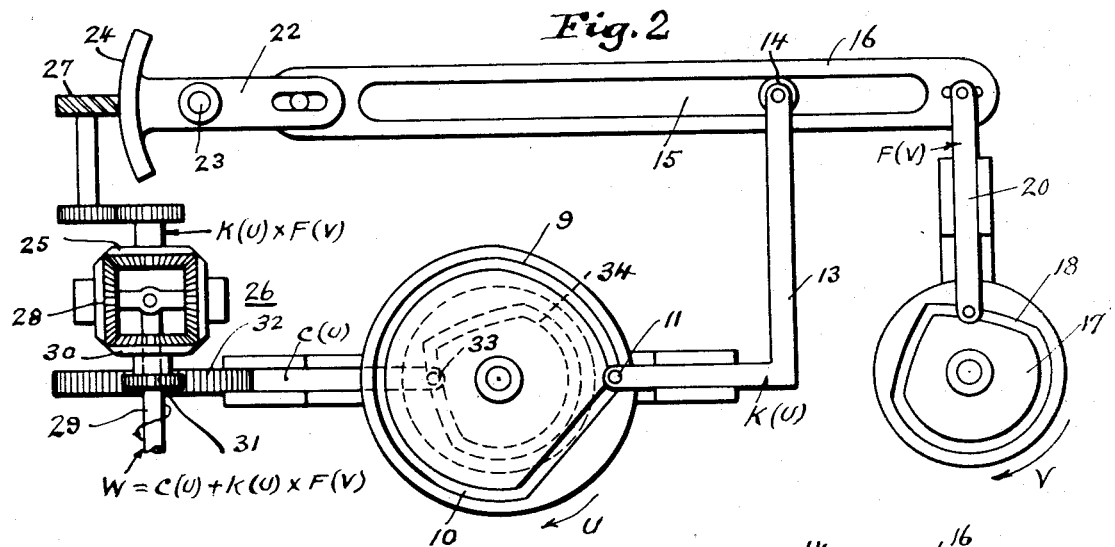

Fig. 2 illustrates a mechanism for the case when $G(W) = W$, but $C(U)$ is not zero, so that Equation 2 reduces to $$W = C(U) + K(U) \times F(V)$$

In the transformed coordinates then, the W-scale is uniform, but the lines do not pass through a common point. A number of the parts correspond both in construction and in function to the elements in Fig. 1 and they have therefore been given corresponding reference characters, and repetition of the matter common to the two figures appears unnecessary. However, the output from lever 16 in Fig. 2 is applied to lever 22 pivoted at 23 and connected by a rack 24 and suitable cooperating gearing to one side 25 of a differential designated as a whole by 26. While the rack 24 and the gear 27 engaged therewith are represented as having diagonal teeth, that is for clarity of illustration only since the shaft upon which pinion 27 is mounted would in practice be made to extend parallel to the pivot 23 and thus permit the use of ordinary gear teeth but for purpose of illustration the differential 26 and gearing associated therewith are shown in the same plane with lever 16. The differential 26 has a center portion 28 connected to an output 29 and a second side member 30 to which is connected a pinion 31. Meshed with pinion 31 is a slidable rack 32 connected to a cam follower 33 that follows a second cam surface 34 on cam 9, which second cam surface represents a function C. The input to differential 26 through the side member 25 is obviously $K(U) \times F(V)$ while the input through the side member 30 is C(U). The two inputs are algebraically combined by the differential, and the output thereof therefore is the solution for the equation $$W = C(U) + K(U) \times F(V)$$

Figure 3:
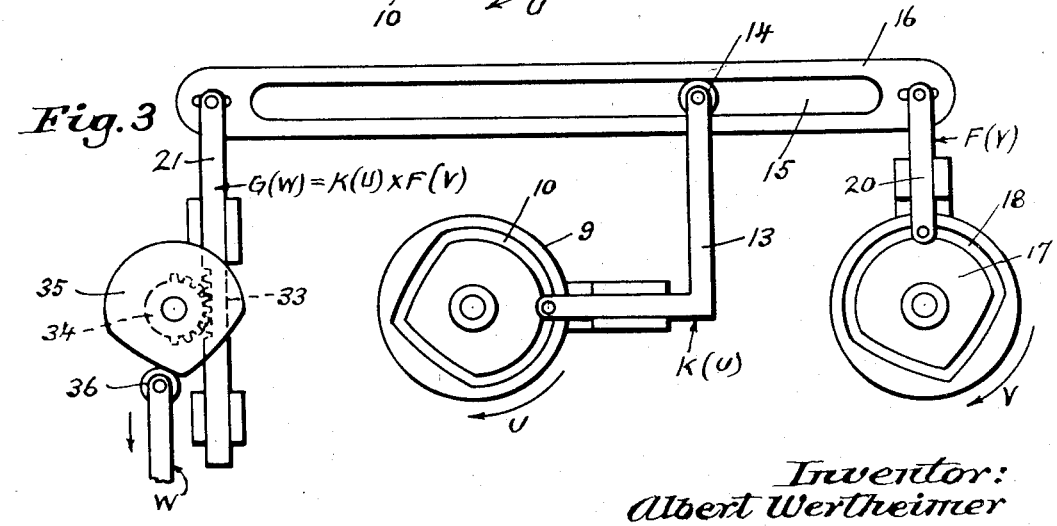

Fig. 3 shows a mechanism for the case when $C(U) = 0$, but $G(W)$ is not equal to W. In the transformed coordinates, both scales are functional, and the lines have a common point. Equation 2 reduces to $$G(W) = K(U) \times F(V)$$

This mechanism likewise has parts in common with the mechanism of Fig. 1 and they too are given the same designation. However, the output member 21 is connected to actuate a rack 33 meshed with a pinion 34 fixed on the shaft upon which cam 35 is secured. The output of member 21 is obviously $K(U) \times F(V)$ which is equal to G(W). The face of cam 35 corresponds to the inverse function of G so that the movement of follower 36 in contact with the face of cam 35 is equal to W.

Fig. 4 is in general similar to Fig. 2 but the output from shaft 29 is applied, through bevel gears 37, to drive a cam 38 having a cam face corresponding to the inverse function of G and it is therefore apparent that the output from cam follower 39 gives the solution for the most general equation $$G(W) = C(U) + K(U) \times F(V)$$

both scales being functional and there being no common point.

In all the foregoing figures the outputs from the various cams are designated in juxtaposition to the elements actuated in accordance with the output.

Almost any relation between three variables (U, V, W) can be represented in a plane by three scales, curved or straight, each graduated with one of the variables according to some law, say F(V), G(U) and H(W), such that the values of the variables determined by the intersection of any straight line with the three scales will satisfy the given relation.

In Fig. 8 are shown three scales wherein the calibrations are proportional to the values wherein three scales 59, 60 and 61 are based upon the functions relating the variables W, U and V respectively, defined by Fig. 6. The scale 60 is so disposed in the plane that any straight line intersecting all three scales gives the values of the variables for the various solutions of the equation represented thereby when the values of two of the variables are known. It is to be understood that scales 59, 60 and 61 may be curved to express other functions.

The embodiment of my invention, based upon the principle stated in the preceding paragraph, is shown in Fig. 5. It includes three coplanar guideways 40, 41 and 42 in which are mounted slides 43, 44 and 45, respectively. The cam 46 is rotated proportionally to the variable V and has a cam face 47 representing the function F. Cam follower 48 is constrained to follow cam face 47 and is suitably connected, as by guide 49 and connecting member 50 to the slide 43, the movement of slide 43 thus being in accordance with F(V). Likewise, the cam 51 is rotated according to a variable U and has a cam face 52 corresponding to function G and thus, through cam follower 53 connecting member 54 and guide 55 moves slide 44 in accordance with G(U). Lever 56 is operatively connected to all three slides 43, 44 and 45. The configurations of guideways 40 and 41 are mathematically related to cam surfaces 47 and 52 respectively, and the configuration of guideway 42 is such that the movement of slide 45 corresponds to H(W). Cam 57 is driven by the movement of slide 45 and has a cam face representing the inverse function of H whereby the movement of cam follower 58 is the solution of any equation $$f(U, V, W) = 0$$

where the relations among the variables and the configurations of the guideways are such that corresponding values of the variables are represented by the points on the guideways on a straight line intersecting the three guideways.

It will be obvious to those skilled in this art that where a function is linear a gearing having the proper ratios may be substituted for a cam in any of the mechanisms shown and described.

I am aware that there have heretofore been special computing devices made capable of solving some specific equation in three variables, without the use of three-dimensional cams, but the present invention is distinguished therefrom in that it provides means for solving any equation of a general type involving three variables.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. Computing mechanism, comprising a longitudinally slotted lever, a first cam rotatable proportionally to a first variable and having a cam surface corresponding to a chosen function of such variable, a cam follower constrained to follow said surface, pivot means disposed to be slidable in the slot in said lever, means connecting said follower to said pivot to slide said pivot in accordance with movement of said follower, a second cam rotatable proportionally to a second variable and having a cam surface corresponding to a chosen function of said second variable, a cam follower constrained to follow the surface on said second cam, means connecting the last mentioned follower to one end of said lever, a second cam surface on said first cam corresponding to a function of said first variable, a second cam follower constrained to follow said second surface, a first rack connected to said second follower; a differential device having a center portion, output means connected thereto, and two side members operatively engaged with said center portion; a gear connected to one of said side members and meshed with said first rack, a second lever pivoted intermediate its ends, means connecting said second lever to the other end of said slotted lever to be rotated on its pivot by movement of said slotted lever about its pivot, and means constituting an operative driving connection between said pivoted lever and the other side of said differential.

2. Computing mechanism, comprising a longitudinally slotted lever, a first cam rotatable proportionally to a first variable and having a cam surface corresponding to a chosen function of such variable, a cam follower constrained to follow said surface, pivot means disposed to be slidable in the slot in said lever, means connecting said follower to said pivot to slide said pivot in accordance with movement of said follower, a second cam rotatable proportionally to a second variable and having a cam surface corresponding to a chosen function of said second variable, a cam follower constrained to follow the surface on said second cam, means connecting the last mentioned follower to one end of said lever, a second cam surface on said first cam corresponding to a function of said first variable, a second cam follower constrained to follow said second surface, a first rack connected to said second follower; a differential device having a center portion, output means connected thereto, and two side members operatively engaged with said center portion; a gear connected to one of said side members and meshed with said first rack, a second lever pivoted intermediate its ends, means connecting said second lever to the other end of said slotted lever to be rotated on its pivot by movement of said slotted lever about its pivot, means constituting an operative driving connection between said pivoted lever and the other side of said differential, a third cam rotatable proportionally to a third variable and having a cam surface corresponding to a function of said third variable, a cam follower constrained to follow the cam surface on said third cam, means constituting a driving connection between said output means and said third cam, and final output means connected to the last mentioned cam follower.

3. Computing mechanism, comprising a first, a second and a third coplanar guideway, a slide operatively mounted in each of said guideways for movement therealong, a first cam rotatable proportionally to a first variable and having on it a cam surface corresponding to a function of said variable, a cam follower constrained to follow said cam surface and operatively connected to the slide in said first guideway, said first guideway having a curvature mathematically related to the function represented by said cam surface, a second cam rotatable proportionally to a second variable and having on it a cam surface corresponding to a function of said second variable, a cam follower constrained to follow the cam surface on said second cam and operatively connected to the slide in said second guideway, said second guideway having a curvature mathematically related to the function represented by the cam surface on said second cam, said third guideway having a curvature mathematically related to a function of a third variable, a lever operatively connecting said three slides, a third cam connected to be rotated proportionally to movement of the slide in said third guideway and having on it a cam surface that corresponds to the above mentioned function of said third variable, a cam follower constrained to follow the cam surface on said third cam, and output means connected to said last mentioned cam follower.

4. Computing mechanism, comprising a first and a second coplanar guideway, a slide operatively mounted in each of said guideways for movement therealong, a first cam rotatable proportionally to a first variable and having on it a cam surface corresponding to a function of said variable, a cam follower constrained to follow said cam surface and operatively connected to the slide in said first guideway, said first guideway having a curvature mathematically related to the function represented by said cam surface, a second cam rotatable proportionally to a second variable and having on it a cam surface corresponding to a function of said second variable, a cam follower constrained to follow the cam surface on said second cam and operatively connected to the slide in said second guideway, said second guideway having a curvature mathematically related to the function represented by the cam surface on said second cam, a rectilinear lever operatively connecting said slides, a third cam drivingly connected to that end of said lever remote from said first slide and having on it a cam surface corresponding to a function of a third variable, a cam follower constrained to follow the cam surface on said third cam, and output means connected to said last mentioned cam follower.

5. Computing mechanism, comprising three coplanar members representing, by their configuration in the common plane and their spatial relation to each other, three variables so related that the solution of the equation expressing the relation between the variables is given by a straight line across said members, means for defining such straight line, means for positioning said defining means to determine a point in said line on one said member in conformity with the represented function of a first variable, means for positioning said defining means to determine a point in said line on a second said member in conformity with the represented function of a second variable, and output means actuated in accordance with the point on the third said member lying in the line so defined.

6. Means for mechanically solving any equation in three variables having the form $f(U, V, W) = 0$, comprising means including a sliding element operating in two dimensions for fixing a point in conformity with the represented function of a first variable, means including a second sliding element operating in two dimensions for fixing a second point in conformity with the represented function of a second variable, output means including a third sliding element actuated in two dimensions by both the aforesaid means and in accordance with a function of a third variable represented by a point rectilinearly related to the first and second points.

7. Means for mechanically solving any equation in three variables having the form $f(U, V, W) = 0$, comprising a linear member movable transversely of its length, a first two dimensional cam connected to said linear member to impart to said member a movement in conformity with the represented function of a first of said variables, a second two dimensional cam connected to said linear member to impart to said linear member at its respective connection a movement in conformity with the represented function of a second of said variables, a first means operating in two dimensions actuated by said linear member in conformity with the represented relation of said first and second variables, and an output means, said first means including an instrumentality to actuate said output means in accordance with values of said third variable corresponding to respective values of the said first and second variables.

ALBERT WERTHEIMER.